(12) United States Patent
Hanning et al.

(10) Patent No.: US 7,900,537 B2
(45) Date of Patent: Mar. 8, 2011

(54) KNIFE ASSEMBLY FOR INSULATION STRIPPING TOOLS

(75) Inventors: Guenther Hanning, Detmold (DE);
Christian Heggemann, Detmold (DE);
Detlev Hetland, Detmold (DE); Thomas Koester, Schlangen (DE); Andreas Wedler, Detmold (DE); Siegfried Storm, Schlangen (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 86 days.

(21) Appl. No.: 12/317,756

(22) Filed: Dec. 29, 2008

(65) Prior Publication Data
US 2009/0188349 A1    Jul. 30, 2009

(30) Foreign Application Priority Data
Jan. 16, 2008  (DE) ............... 20 2008 000 596 U

(51) Int. Cl.
*H02G 1/12* (2006.01)
*B21F 13/00* (2006.01)

(52) U.S. Cl. .................................... 81/9.43; 30/91.1
(58) Field of Classification Search ............ 81/9.4–9.44; 30/90.1, 91.1, 91.2
See application file for complete search history.

(56) References Cited

U.S. PATENT DOCUMENTS

| 4,197,768 | A | * | 4/1980 | Undin ........................... 81/9.43 |
| 4,703,674 | A | * | 11/1987 | Chen et al. ..................... 81/9.42 |
| 5,245,894 | A | * | 9/1993 | Undin ........................... 81/9.43 |
| 5,572,911 | A | * | 11/1996 | Schmode et al. ................ 81/9.43 |
| 5,713,249 | A | * | 2/1998 | Liversidge ..................... 81/9.43 |
| 6,895,836 | B2 | | 5/2005 | Hetland |
| 6,910,401 | B2 | | 6/2005 | Tapper |

FOREIGN PATENT DOCUMENTS

| DE | 1941 188 A | 2/1971 |
| DE | 42 05 194 C1 | 7/1993 |

* cited by examiner

*Primary Examiner* — Hadi Shakeri
(74) *Attorney, Agent, or Firm* — Lawrence E. Laubscher, Sr.; Lawrence E. Laubscher, Jr.

(57) ABSTRACT

A pliers-type insulation stripping tool includes a releasable fastening device for fastening a knife cassette to at least one of the knife carrier members that are longitudinally displaced by the pivotally connected tool handle members to remove a severed length of insulation from a longitudinally-arranged insulated conductor that is clamped between by the tool gripping jaws. A U-shaped resilient fastener spring wire has leg portions that are resiliently biased apart, at least one of the legs containing a laterally extending bulge portion that extends into a corresponding locking slot contained in a side wall of the knife cassette. To release and replace the knife cassette, the protruding free extremities of the leg portions of the spring wire are displaced together, thereby to remove the leg bulge portion from the slot contained in the cassette outer wall.

4 Claims, 5 Drawing Sheets

KNIFE ASSEMBLY FOR INSULATION STRIPPING TOOLS

REFERENCE TO RELATED APPLICATIONS

This application is a companion application to the Storm et al application Ser. Nos. 12/290,479 entitled "Insulation Stripping Tool With Striker Means", 12/290,557 entitled "Hand Grip Shell for Pliers-Type Tools", and 12/290,588 entitled "Insulation Stripping Tool With Displaceable Knife Carrier Means", all filed Oct. 31, 2008, and the Hanning et al application Ser. No. 12/316,487 filed Dec. 12, 2008.

BACKGROUND OF THE INVENTION

1. Field of the Invention

A pliers-type insulation stripping tool includes a releasable fastening device for fastening a knife cassette to at least one of the knife carrier members that are longitudinally displaced by the pivotally connected tool handle members to remove a severed length of insulation from a longitudinally-arranged insulated conductor that is clamped between by the tool gripping jaws. A U-shaped resilient spring wire fastener device has leg portions that are resiliently biased apart, at least one of the legs containing a laterally extending bulge portion that extends into a corresponding locking slot contained in a side wall of the knife cassette.

2. Description of Related Art

Pliers-type insulation stripping tools are well known in the patent prior art, as shown by the U.S. patents to Schmode et al No. 5,572,911, Hetlund et al No. 6,895,836, and Tapper No. 6,910,401, among others. As is customary in the art, an insulated conductor having an end portion that is to be stripped is gripped between a pair of clamping jaws upon pivotal movement of the tool handles toward an intermediate position, and cutting means are operable to sever a length of the insulation layer. Upon further pivotal movement of the handles from the intermediate position toward the final closed position, the cutting means are displaced to strip the severed length of insulation from the conductor.

In the Tapper patent, the connection between the pivotally connected arms is a tubular pivot bearing. As a result, the two arms of course can be pivoted toward each other, but the nevertheless retain firmly connected with each other as a unit. Received in this pivot bearing is a pivot pin that also connects the cutting assembly with the retracting rod of the stripping linkage. The disadvantage of this design is represented by the fact that the cutting unit can be removed only completely from the pliers-type tool, and that removal of the cutting is laborious and time-consuming because, in addition, the pivot pin must be removed from its bearing. Furthermore, the pivot pin proved to be rather ill-suited as a means for fastening the cutting unit to the connecting rod of the displacement means, especially as a result of wear and bending of the pivot pin during extended use of the too. Even if the pivot pin is only slightly bent, it is difficult to remove the pivot pin for replacement of the knife assembly, and to subsequently reinsert the pivot pin into its bearing.

Consequently, the present invention was developed to provide an insulation stripping tool in which the individual knife-bearing cassettes may be readily removed and replaced on their respective carrier arms, whereby complete removal of the cutting means from the tool is avoided.

SUMMARY OF THE INVENTION

Accordingly, a primary object of the present invention is to provide a pliers-type insulation stripping tool including fastening means for releasably fastening the individual knife cassettes to their respective carrier members, respectively.

According to a more specific object of the invention, the carrier members are provided with guide plates for guiding the knife cassettes during the mounting thereof on the carrier members, whereby resilient fastener means on the carrier members are aligned with corresponding locking slots contained in the knife cassettes, respectively.

A further object of the invention is to provide a resilient generally U-shaped wire type fastener device that is durable, inexpensive and easy to manufacture and install, which fastener device includes leg portions that are resiliently biased apart to cause outwardly extending bulge portions on the leg portions to project outward into corresponding lock slots contained in the knife cassettes. The free extremities of the fastener legs portions extend outwardly from the ends of the cassettes, thereby to permit manual compression of the leg portions together to withdraw the bulge portions of the fastener leg portions from the respective locking slots. The U-shaped resilient wire member guarantees a constant and uniform spring force over the entire opening angle of the spring.

The removability of the knife cassettes from their respective carrier members facilitates the easy exchange of the cutting knives in terms of varying cutting requirements in accordance with the size and cross-sectional configurations of the insulated that are to be stripped.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 5:
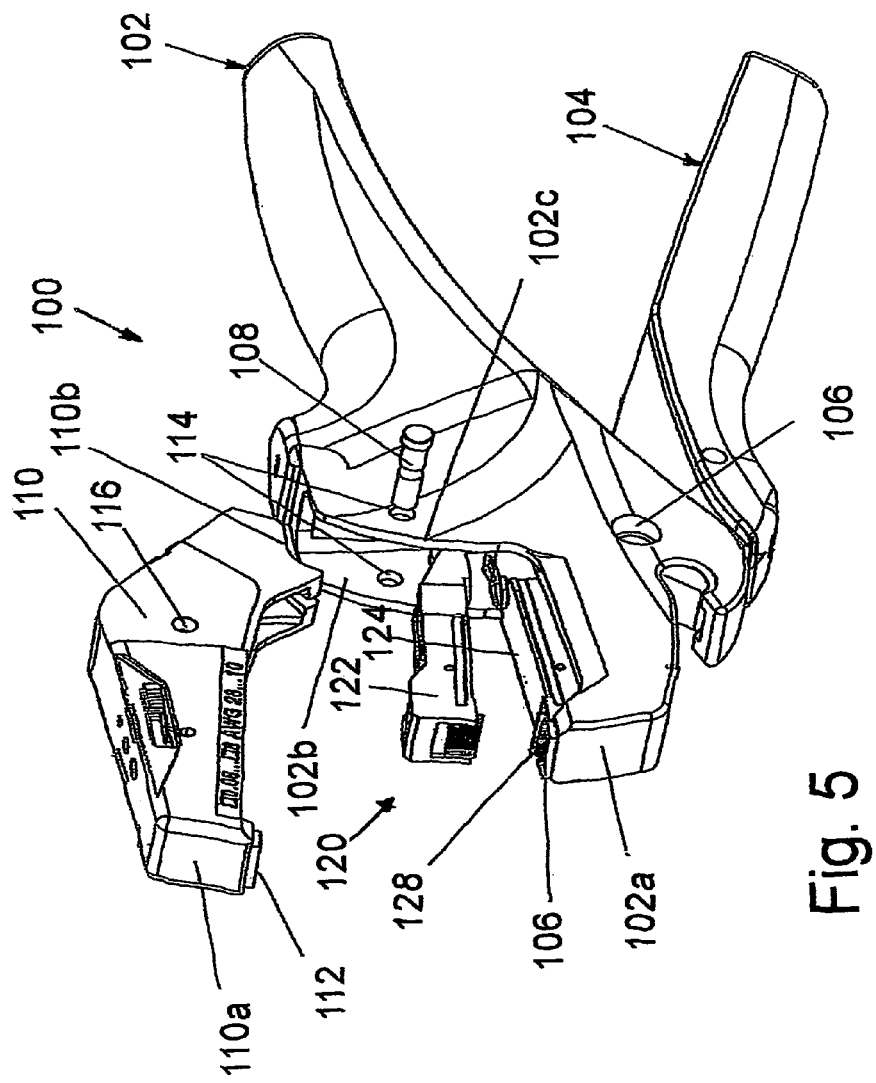
FIG. 5 is a perspective view of a pliers-type insulation tool of the prior art.

Referring first more particularly to FIG. 5, it is customary in the prior art to provide a pliers-type insulation stripping tool 100 including a pair of handle members 102 and 104 connected for pivotal movement about a first pivot axis 106. At its forward end, the handle member 102 is provided with an integral jaw portion 102a that carries a first conductor gripping member 106. The handle 102 includes a hollow shell portion containing a chamber defined between a pair of parallel spaced side walls 102b and 102c. Pivotally mounted in this chamber for pivotal movement about a second pivot axis defined by pivot pin 108 is a moveable jaw member 110 having at one end a jaw portion 110a that carries a second conductor gripping member 112 opposite the first gripping member 106. The pivot pin 108 extends through aligned bores 114 contained in the shell portion side walls, and a corresponding bore 116 contained in the moveable jaw member 110. The pivot pin 108 defines a pivot axis that is parallel with the handle pivot axis. A cam surface 110b on the movable jaw member 110 is engaged by cam follower means (not shown) that is operable by the handle 104 to pivot the jaw member 110 from a normal open position toward a closed clamping position in which the conductor gripping members 106 and 112 are brought into clamping engagement with one end of an insulated conductor C that is inserted longitudinally between the clamping jaws 102a and 110a.

Mounted within the chamber defined in the shell portion of the handle 102 are knife carrier means 120 including pivotally connected upper and lower knife carrier members 122 and 124 that carry upper and lower knife means 126 and 128, respectively. As the handle member 102 and 104 are initially pivotally displaced toward each other, the carrier members are pivotally displaced together from a normally open condition toward a closed cutting condition in which the cutting blades of the knife means sever a length of the insulation layer of the conductor C that is gripped between the gripping members 106 and 112. As the handles 102 and 104 are subsequently further pivoted together from the intermediate position toward the finally closed position, the knife carrier means, in the closed cutting condition, are longitudinally displaced by an internal linkage displacement arrangement (not shown) to effect stripping of the severed length of insulation from the conductor that is gripped between the gripping members 106 and 112. This prior art insulation stripping tool is illustrated and described in greater detail in the companion pending Storm et al patent application Ser. No. 12/290,558 filed Oct. 31, 2008.

Figure 1:
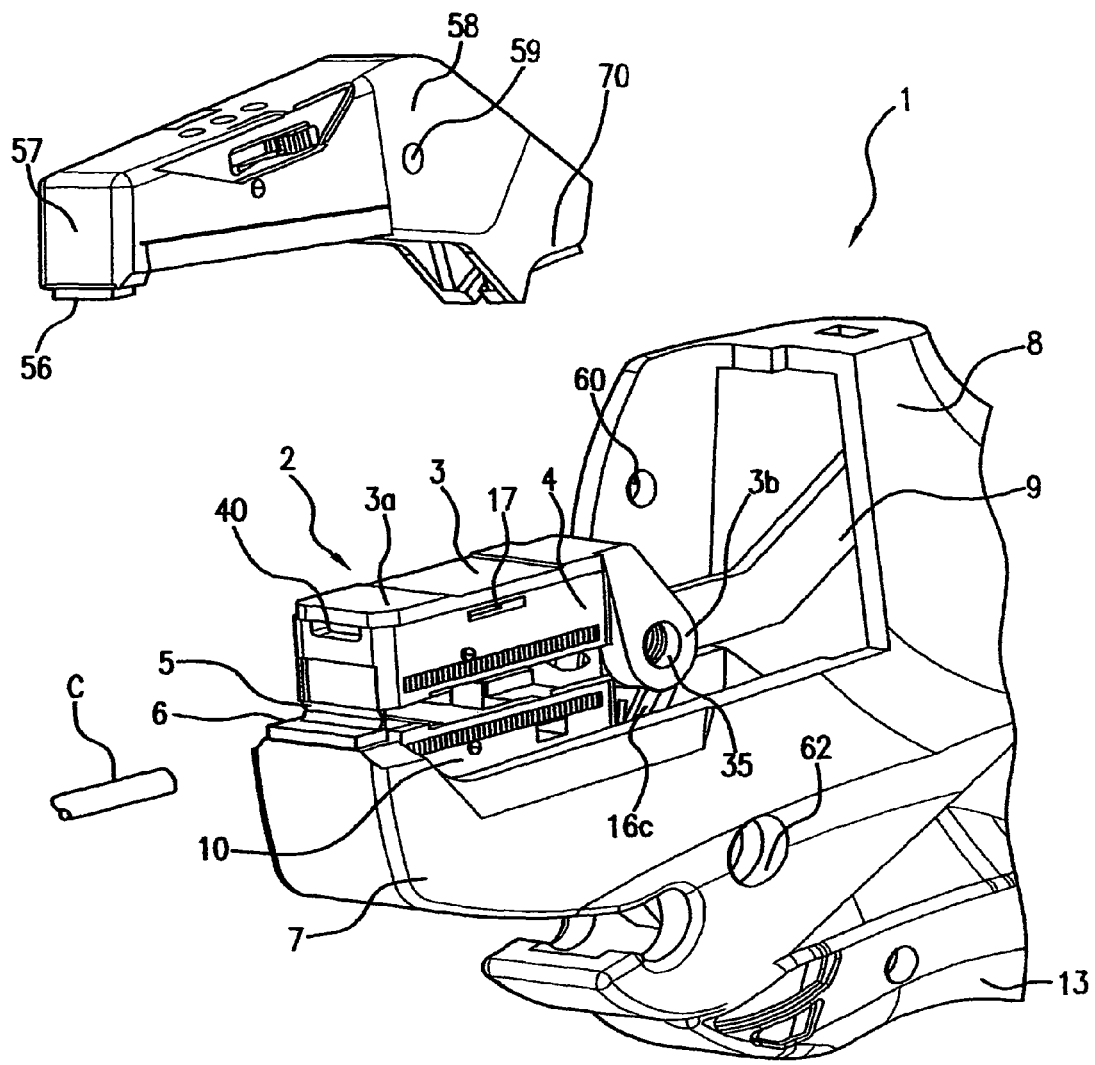
FIG. 1 is detailed front perspective view of the insulation stripping tool of the present invention, with certain parts removed, when in the closed assembled condition.
Figure 2:
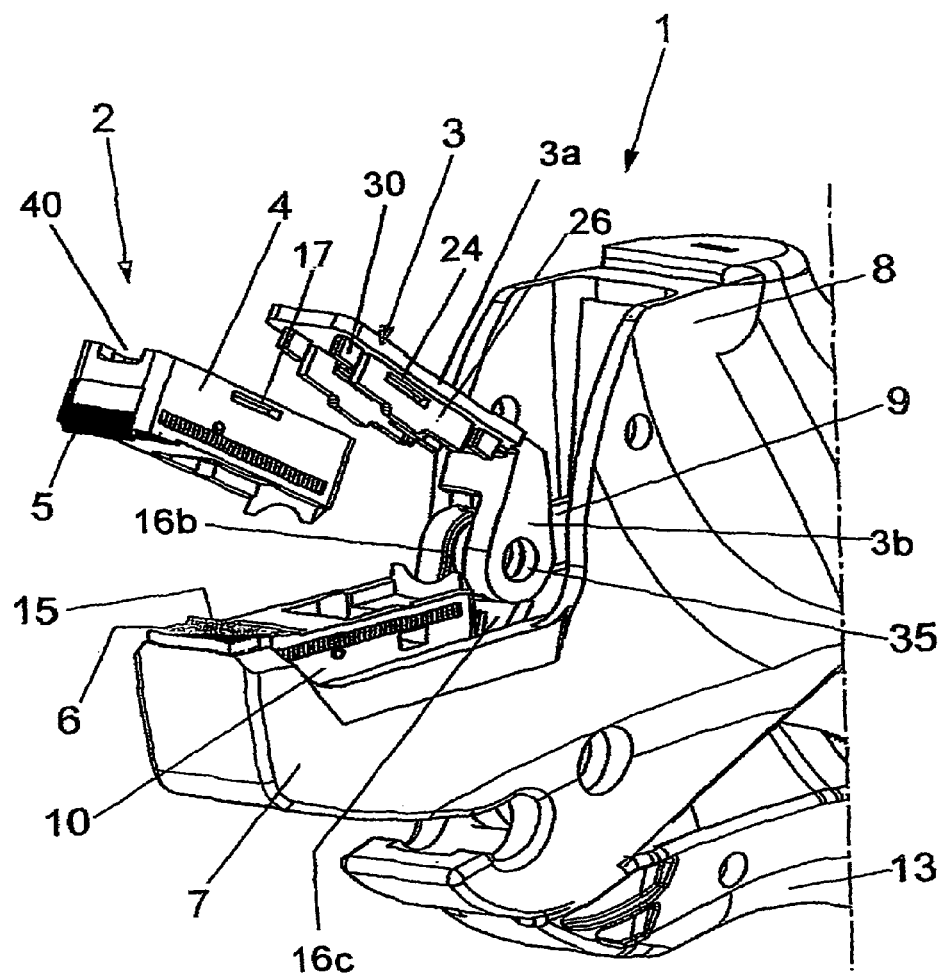
FIG. 2 is a corresponding view of the stripping tool when in the open, partially-disassembled condition.

Referring now to FIG. 1, in accordance with the present invention, the insulation stripping tool 1 includes a pair of pivotally connected handle members 8 and 13 for initially producing rigid clamping of the insulated conductor and severing of a length of the insulation layer, and for subsequently stripping the severed insulation layer from the conductor. To this end, a lower conductor clamping member 6 is provided on the jaw portion 7 of the handle member 8, and a corresponding opposed upper clamping member 56 is provided on the jaw portion 57 of the hollow upper jaw member 58 that is pivotally connected with the handle member 8 for displacement about the pivot axis extending through aligned bores 59 and 60 contained in the side walls of the upper jaw member and in the side walls of the handle member shell portion, respectively.

Figure 4:
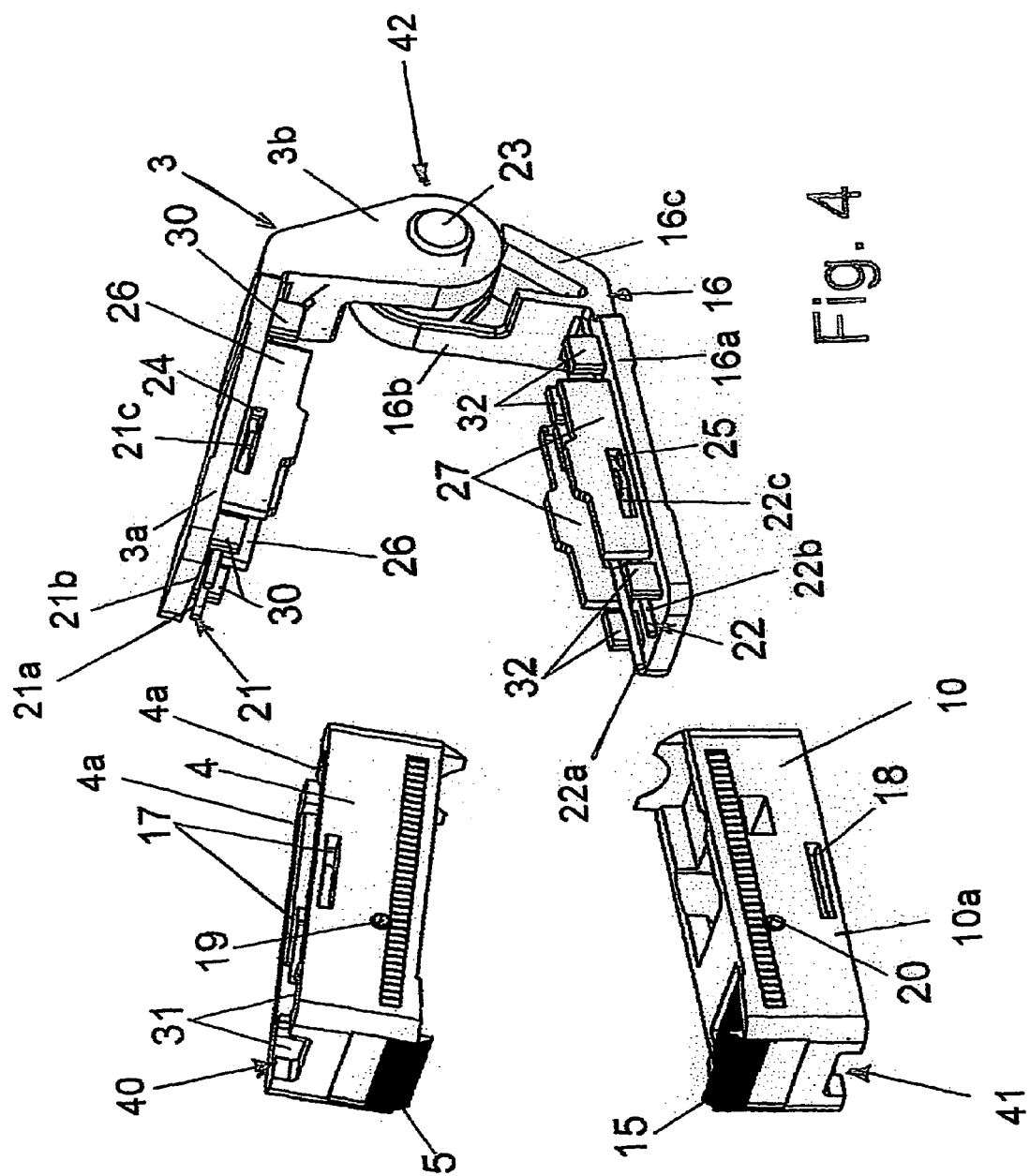
FIG. 4 is a perspective view of the knife assembly when in the open disassembled condition.

Arranged within the chamber defined by the shell portion of the handle 8 is a knife arrangement 2 including knife carrier means 42 (FIG. 4) comprising an upper knife carrier member 3 and a lower knife carrier member 16 that are pivotally connected by a pivot pin 23 which extends through aligned bores 35, thereby to define a pivot axis parallel with the main handle pivot axis. The pivot pin 23 also connects the knife carrier assembly 42 with the adjacent end of the retracting rod 9, as will be explained in greater detail below. The upper carrier member 3 includes a planar support portion 3a and an angularly arranged pivot arm portion 3b, and the lower carrier member 16 includes a planar support portion 16a and an angularly arrange pivot arm portion 16b. The lower knife carrier member 16 also includes a resilient leaf spring portion 16c that biases the knife carrier members toward the open condition.

Mounted on the adjacent faces of the planar portions 3a and 16a of the upper and lower carrier member portions are rectangular knife cassettes 4 and 10 that carry at corresponding ends a pair of opposed cutting blade means 5 and 15, respectively. Each of these cutting blade means comprises a set of lamellar cutting blades that are pivotally self-adjustable about pivot pins 19 and 20 (FIG. 3) to conform to the cross-sectional size and configuration of the insulated cable C.

In accordance with a characterizing feature of the present invention, the knife cassettes 4 and 10 are removably connected with the adjacent surfaces of the planar portions 3a and 16a of the carrier members, and releasable fastener devices 21 and 22 (FIGS. 3 and 4) are provided for releasably fastening the cassettes to the upper and lower carrier members. More particularly, the lower surface of the upper carrier planar portion 3a is provided with a pair of rigid parallel spaced longitudinally-extending inner side walls 26 containing a pair of opposed slots 24, and two sets of parallel guide plates 30. Similarly, the upper surface of the lower carrier member planar portion 16a is provided with a pair of parallel spaced longitudinally-extending inner side walls 27 containing a pair of opposed slots 25, and two sets of parallel guide plates 32. The upper surface of the upper knife cassette contains a longitudinal groove 40 that defines a pair of parallel space outer side walls 4a containing a pair of opposed slots 17, and the lower surface of the lower cassette 10 contains a longitudinal groove 41 that defines a pair of outer side walls 10a containing a pair of opposed slots 18. Mounted between the inner side walls 26 of the upper carrier member 3 is a generally U-shaped longitudinally-arranged resilient wire upper spring member 21 having a pair of leg portions 21a and 21b that are resiliently biased apart and the free end extremities s of which protrude outwardly from the carrier member. Each leg of the resilient spring member contains an outward bulge portion 21c that extends through and laterally outwardly of the corresponding slot 24. Similarly, a lower generally U-shaped wire spring member 22 having leg portions 22a and 22b that are resiliently biased apart is mounted between the side walls 27 of the lower carrier member 16. These leg portions include lateral bulge portions 22c that extend through and outwardly of the opposed slots 25 contained in the inner side walls 27, and the free end extremities of the leg portions protrude from the carrier member 16.

Figure 3:
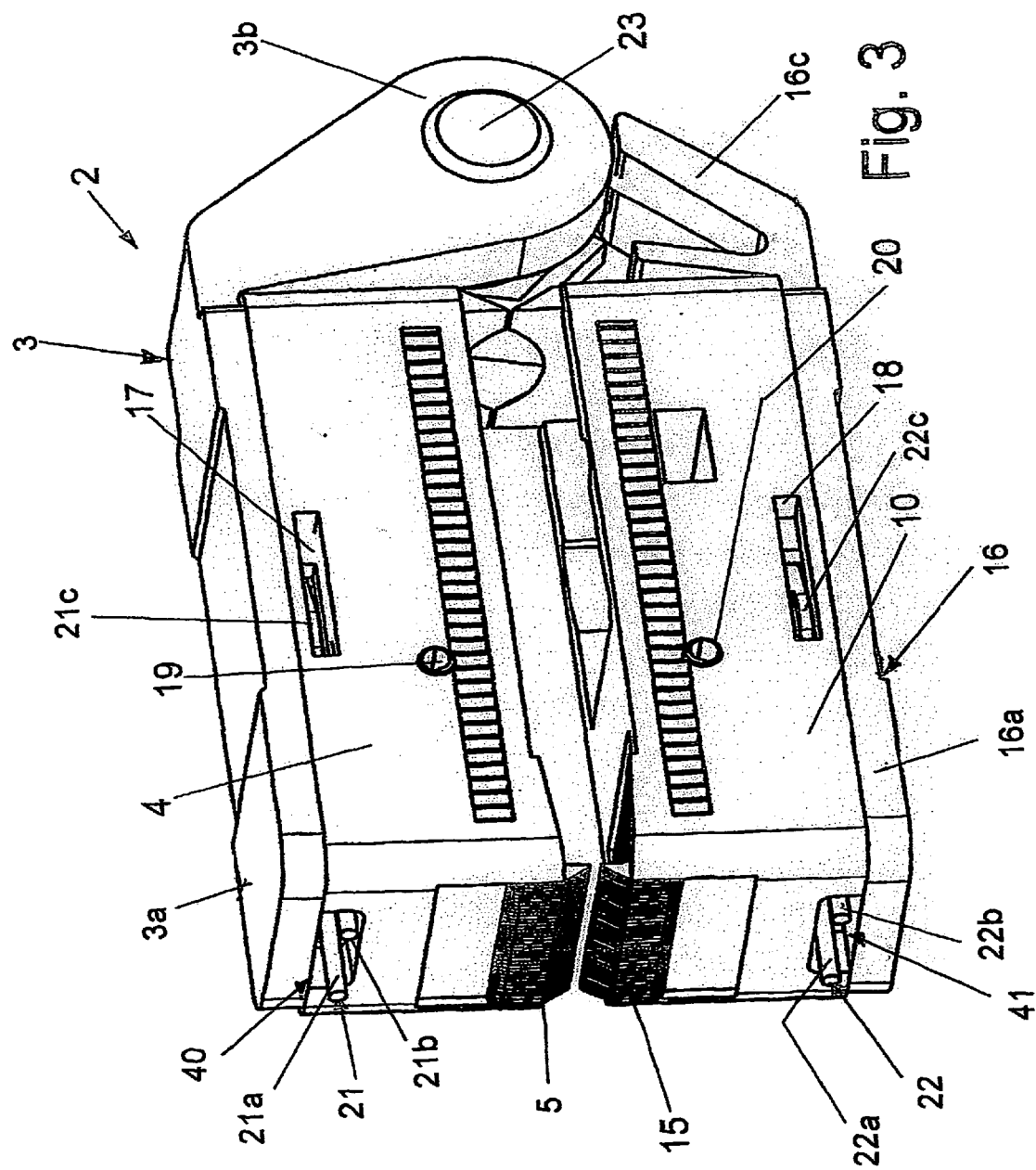
FIG. 3 is a perspective view of the knife assembly when in the closed assembled condition.

To assemble the knife cassettes 4 and 10 to the assembled condition of FIG. 3, the cassette 5 is displaced laterally upwardly toward the upper carrier portion so that the inner side walls 26 extend into the groove 40 with the guide plates 30 on the carrier member in sliding engagement with corresponding inner guide surfaces 31 on the cassette outer side walls 4a, whereupon the wire spring bulge portions 21c snap into engagement with the corresponding opposed slots 17 contained in the cassette outer walls 4a. The upper cassette is thus fastened to the upper carrier member with the free extremities of the leg portions of the spring 21 protruding from the slot 40 as shown in FIG. 3. Similarly, the lower cassette 10 is displaced laterally downwardly relative to the lower carrier member to cause the inner side walls 27 to extend into the lower groove 41a guided by the guide walls 32, whereupon the bulge portions 25 snap into the corresponding opposed slots 18, thereby to fasten the cassette 10 to the carrier member 16. Again, as shown in FIG. 3, the free extremities of the leg portions 22a and 22b protrude outwardly from the groove 41.

Operation

Assume that the pivotally connected upper jaw member 58 and the lower jaw portion 7 are initially biased apart toward the open condition by spring means (not shown), and that the knife carrier members 3 and 4 are biased apart by the resilient leaf spring portion 16c of the lower carrier member 16. The end of the conductor C to be stripped is introduced longitudinally into the space between the open knife cassettes 4 and 10, whereupon the handles 8 and 13 are displaced together toward an intermediate position in which the upper jaw is pivoted by internal operating means (not showed) in engagement with the cam surface 70, thereby to cause the insulated conductor to be rigidly gripped between the clamping members 6 and 56. Simultaneously, the carrier members 4 and 16 are pivoted together by the handles to cause severing of a length of the insulation layer of the conductor by the cutting blades 5 and 15.

As is known in the art, upon further pivoting together of the handle members from the intermediate position toward the final closed condition, the retraction link 9 is displaced to the right by displacing means (not shown), thereby to cause the blade cutters 5 and 15 to strip from the conductor the severed length of insulation. The handle members are then pivotally opened to release the conductor with the stripped bare end for removal from the jaws of the tool.

In the event that it is desired to replace either knife cassette, the exposed free extremities of the leg portions of the associated fastening spring are brought together, thereby to withdraw the bulge portions of the legs from the associated slots 17 or 18 of the outer walls 4a or 10a of the cassette, thereby to release the cassette for removal from the tool. A replacement cassette may then be laterally displaced for mounting on the associated carrier member until the bulge portions of the associate fastening spring snap into the associated slots 17 or 18 contained in the cassette outer walls.

While in accordance with the provisions of the patent Statutes the preferred forms and embodiments of the invention have been illustrated and described, it will be apparent to those skilled in the art that changes may be made without deviating from the invention described above.

What is claimed is:

1. An insulation-stripping pliers-type tool (1) for stripping a layer of insulation from an insulated conductor, comprising:
   (a) a pair of handle members (8, 13) pivotally connected for displacement about a first pivot axis between open, intermediate and closed positions;
   (b) a pair of clamping jaws (7, 57) operable by said handle members between open and closed positions when said handle members are operable from said open position to said intermediate position, said clamping jaws in said closed position being operable to clamp therebetween the end of an insulated conductor introduced longitudinally between said clamping members;
   (c) a pair of rectangular knife cassettes (4, 10) each having a cutting device (5, 15) thereon, each of said knife cassettes containing a longitudinal groove (40, 41) defining a pair of parallel spaced outer side walls (4a, 10a);
   (d) a pair of pivotally connected knife carrier members (3, 16) supporting said knife cassettes with said cutting devices extending opposite each other, each of said knife carrier members including a flat portion (3a, 16a), and a pair of parallel spaced longitudinally-extending inner side walls (26, 27) extending normal to said flat portion, said knife cassette outer side walls being adjacent and parallel with the outer surfaces of said carrier member inner side walls, respectively;
   (e) a mechanism (21, 22) for releasably fastening said knife cassettes with the associated carrier members, respectively, said knife carrier members being relatively operable from an open separated position to a closed cutting position when said handle members are displaced from said open position to said intermediate position, said cutting devices being operable when said knife carrier members are in said closed position to sever a length of the insulation layer of the conductor clamped by said clamping jaws; and
   (f) means (9) for longitudinally displacing said knife carrier members, when said carrier members are in said closed cutting position, in a direction to strip the severed insulation length from the conductor;
   (g) said cassette fastening mechanism including a generally U-shaped resilient wire member arranged longitudinally between said carrier member inner side walls, said wire member having a pair of leg portions (21a, 21; 22a, 22b) that are joined at one end by a connecting portion, at least one of said leg portions including a bulge portion (21c, 22c), that extends outwardly in locking relation through aligned slots (24, 25; 17 18) contained in said inner and said outer side walls, respectively.

2. An insulation-stripping tool as defined in claim 1, wherein the free extremities of said fastener member leg portions extend outwardly from the slots contained in said cassettes when said knife cassettes are fastened to said carrier members, respectively.

3. An insulation-stripping tool as defined in claim 1, wherein one of said knife carrier members includes an integral resilient portion (16c) operable to bias said knife carrier members toward said open position.

4. An insulation-stripping tool as defined in claim 1, wherein at least one of said cutting devices comprises a set of parallel contiguous lamellar knife blades.

\* \* \* \* \*